United States Patent
Listopad

(10) Patent No.: US 8,289,181 B2
(45) Date of Patent: Oct. 16, 2012

(54) POWER SUPPLY UNIT

(75) Inventor: Manfred Listopad, Vienna (AT)

(73) Assignee: Moeller Gebaudeautomation GmbH, Schrems (AT)

( * ) Notice: Subject to any disclaimer, the term of this patent is extended or adjusted under 35 U.S.C. 154(b) by 520 days.

(21) Appl. No.: 12/609,607

(22) Filed: Oct. 30, 2009

(65) Prior Publication Data

US 2010/0109896 A1    May 6, 2010

Related U.S. Application Data

(60) Provisional application No. 61/110,150, filed on Oct. 31, 2008.

(30) Foreign Application Priority Data

Oct. 31, 2008    (AT) .................................. A 1704/2008

(51) Int. Cl.
*G08B 23/00*    (2006.01)
*G08B 29/00*    (2006.01)

(52) U.S. Cl. ..................... 340/693.4; 340/507; 340/513; 340/514; 340/636.1; 340/693.1; 340/693.2; 340/628

(58) Field of Classification Search ............... 340/693.4, 340/693.2, 514
See application file for complete search history.

(56) References Cited

U.S. PATENT DOCUMENTS

| | | | |
|---|---|---|---|
| 4,972,181 A | 11/1990 | Fiene | |
| 5,621,394 A | 4/1997 | Garrick et al. | |
| 5,905,365 A | 5/1999 | Yeh | |
| 6,362,743 B1 | 3/2002 | Tanguay et al. | |

FOREIGN PATENT DOCUMENTS

| | | |
|---|---|---|
| DE | 103 03 294 A1 | 8/2004 |
| EP | 0 069 964 A1 | 1/1983 |
| EP | 1 184 825 A2 | 3/2002 |
| GB | 1 187 840 | 4/1970 |
| GB | 2 312 343 | 10/1997 |
| JP | 08186983 | 7/1996 |
| JP | 10268950 | 10/1998 |
| WO | WO 99/36891 | 7/1999 |

*Primary Examiner* — Donnie Crosland
(74) *Attorney, Agent, or Firm* — Henry M. Feiereisen LLC

(57) ABSTRACT

A power supply unit for a fire detector, especially a smoke alarm, includes a power unit and battery terminals for connecting a predeterminable battery. The power unit has first connection means for connection to a power supply network and second connection means for connecting the fire detector. In order to increase the functionality of a fire alarm, the battery terminals are operatively connected by at least one first electric connection with the second connection means. The first electric connection includes hereby at least one diode.

10 Claims, 2 Drawing Sheets

POWER SUPPLY UNIT

CROSS-REFERENCES TO RELATED APPLICATIONS

This application claims the benefit of prior filed U.S. provisional Application No. 61/110,150, filed Oct. 31, 2008, pursuant to 35 U.S.C. 119(e), the content of which is incorporated herein by reference in its entirety as if fully set forth herein.

This application claims also the priority of Austrian Patent Application, Serial No. A 1704/2008, filed Oct. 31, 2008, pursuant to 35 U.S.C. 119(a)-(d)

BACKGROUND OF THE INVENTION

The present invention relates to a power supply unit for a fire detector.

The following discussion of related art is provided to assist the reader in understanding the advantages of the invention, and is not to be construed as an admission that this related art is prior art to this invention.

Fire detectors usually have a battery for power supply. It has been noticed that in approximately two-thirds of all cases of fire in the USA where people were killed and where the respective building had a fire detector, the battery of the respective fire detector had an insufficient charge state in order to ensure the function of the fire detector or there simply was none.

It is known to supply a fire detector via a power supply network such as the 230 V AC network with power. However, according to the relevant European norm EN 14604 it is required to have a power supply that is independent of the power supply network in order to ensure the operation of the fire detector even in the case of a loss of the power supply via the power supply network.

Power supply units for a fire detector are therefore known which in addition to a transformer and a rectifier further comprise a rechargeable battery as well as a charging and monitoring circuit. The disadvantageous aspect in such power supply units is that only very complex charging and monitoring circuits are capable of ensuring the life of a rechargeable battery over a period of approximately ten years.

It would therefore be desirable and advantageous to address prior art shortcomings and to enable an enhanced and reliable functional readiness of a fire detector in a simple manner.

SUMMARY OF THE INVENTION

According to one aspect of the present invention, a power supply unit for a fire detector, in particular a smoke alarm, includes a power unit having battery terminals for connecting a battery, said power unit having first connecting means for connection to a power supply network and second connecting means for connection of the fire detector; and at least one first electric connection operatively connecting the battery terminals to the second connecting means and including at least one diode.

The functionality of a fire detector can be increased considerably as compared with purely battery-operated systems. As a result, a fire detector can be supplied simply with electric power from a power supply network. It is thus also possible to ensure the supply of the fire detector with electric power in the case of a power failure and consequently the proper function of the fire detector. The functionality of fire detectors can thus also be increased considerably as compared with the known, purely battery-operated embodiments, because the used battery is merely used as a backup and an exchange of the same is necessary only every ten years, and not every year as was the case before with purely battery-operated fire detectors. The health and life of many people can thus be saved, who would otherwise run the risk of failing to detect a fire in time as a result of a non-functioning fire detector and could thus successfully flee from the same. As a result, the functionality of a fire detector can be ensured even in the case of a short circuit between the battery terminals, an empty or defective battery or interrupted feed lines.

According to another aspect of the present invention, a method for testing the battery voltage in a fire detector includes the steps of connecting a battery to battery terminals of a power unit, outputting a test signal at a test output to a stabilization circuit of the power unit in predetermined intervals for a predefined period of time for lowering an electric voltage output by the stabilization circuit to connecting means of the power unit for connection of the fire alarm to a predeterminable minimum permissible operating voltage of the fire detector, and measuring a battery voltage applied to the connecting means.

This helps ensure simple and uncomplicated testing of the battery voltage which encumbers the life of the battery to an only very low extent. It can thus be assured that an inserted battery is functional. The functionality of the fire detector can thus be increased in a simple way.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
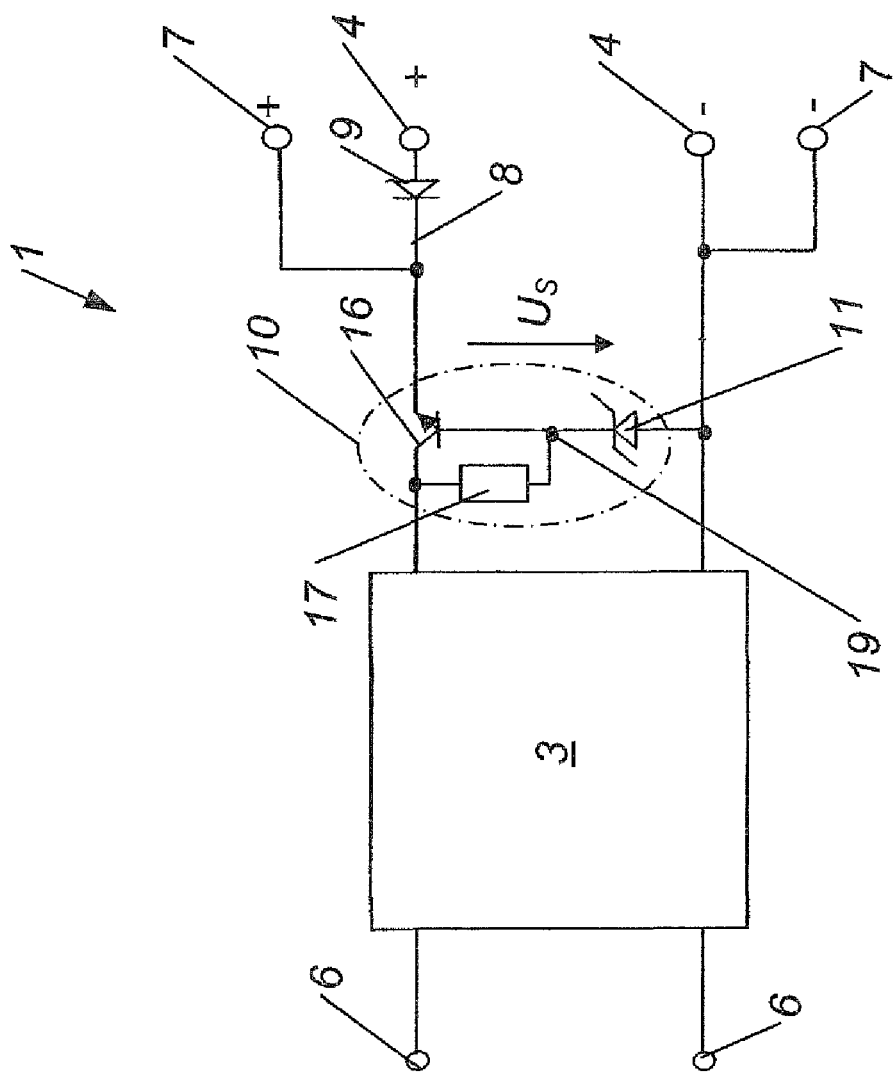
FIG. 1 shows a schematic circuit diagram of a first embodiment of a power supply unit according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic circuit diagram of a first embodiment of a power supply unit according to the present invention, generally designated by reference numeral 1 for a fire detector 2, especially a smoke alarm. The power supply unit includes a power unit 3 and battery terminals 4 for connecting a predeterminable battery 5, with the power unit 3 having first connection means 6 for connection to a power supply network and second connection means 7 for connecting the fire detector 2. The battery terminals 4 are operatively connected by at least one first electric connection 8 with the second connection means 7. The first electric connection 8 has at least one diode 9.

The functionality of a fire detector 2 can be increased considerably as compared with purely battery-operated configurations. A fire detector 2 can thus be simply supplied with electric power form the power supply network. It is thus also possible to ensure the supply of the fire detector 2 with electric power in the case of a power failure and consequently the proper function of the fire detector 2. The functionality of fire detectors 2 can thus also be increased considerably as compared with known, purely battery-operated embodiments, because the used battery 5 is merely used as a backup and an exchange of the same is necessary only every ten years, and not every year as was the case before with purely battery-operated fire detectors. The health and life of many people can thus be saved, who would otherwise run the risk of failing to detect a fire in time as a result of a non-functioning fire detector and can thus successfully flee from the same. As a result, the functionality of a fire detector 2 can be ensured even in the case of a short circuit between the battery terminals, an empty or defective battery or interrupted feed lines, such as the first electric connection for example.

The power supply unit 1 in accordance with the invention is provided for supplying a fire detector 2 with electric power, which power is taken primarily from a power supply network, e.g. an AC voltage network such as the 230V AC voltage network in Europe or the 110V AC voltage network in the US, or a DC network such as the 28V on-board network in planes with turboprop drive. The power supply unit 1 in accordance with the invention is further constructed for connection of a predeterminable battery 5 which ensures the power supply of the fire detector 2 in the event of a failure of the power supply network.

The fire detector 2 may involve any kind of fire detector 2 which is provided or suitable to detect a fire or the like. Any kind of detection can be provided. An application of the fire detector 2 as a smoke alarm is especially preferred. In this case, the fire detector has a photoelectric smoke detector which is arranged for example as a semiconductor chip, preferably of type Motorola MC 145010.

The power unit 3 may include a transformer, with the direct transformation of the network voltage of the power supply network to a voltage provided for the operation of the fire detector 2 being provided, but also the arrangement of the power supply unit as a switching power supply, especially when the power supply network concerns a DC network. The power unit 3 can be arranged in such a way that it outputs a voltage which is larger than the battery voltage plus the voltages falling at the semiconductor components, preferably substantially larger than 11V. Electrical isolation of the power supply of the fire detector 2 from the power supply network can be achieved by the transformer. The power unit 3 further includes a rectifier. e.g. a bridge rectifier, so that a direct voltage is provided at the output of the power unit 3.

The power unit 3 has a first connection means 6 for connection to a power supply network. The first connection means 6 can be arranged in the form of screw terminals or clamp terminals. An arrangement as a plug for the respectively used sockets can also be provided. The power unit 3 further includes second connection means 7, configured as plugs, terminal lugs or terminals, for the connection of the fire detector 2.

The power supply unit 1 has a stabilization circuit 10 for stabilizing the electric voltage at the second connection means 7. The stabilization circuit 10 is arranged between the power unit 3 and the first electric connection 8, thereby substantially preventing damage to the fire detector 2 as a result of surges. The stabilization circuit 10 includes a first Zener diode 11, e.g. a temperature-compensated Zener diode. The stabilization circuit 10 further includes a transistor 16 whose base is applied to the input of the first Zener diode 11 at the non-conducting side, and an ohmic resistor 17 which is switched between the collector and the base of the transistor 16.

The battery terminals 4 of the power supply unit 1 are provided for connecting the battery 5 which can usually be predetermined by the arrangement of the battery terminals 4 because one type of battery terminals 4 can usually merely cooperate with one type of battery 5 and the connection of other batteries 5 can be prevented. The power supply unit 1 can be configured for operation with a 9V lithium battery, and the battery terminals 4 are arranged accordingly for connection of such a battery 4. As a result of such a battery 4, the functionality of the battery 4 can be expected over a period of approximately 10 years during the operation of the power supply unit 1. It is provided that the battery terminal 4 is arranged for a battery type which supplies a maximum voltage which is lower than the voltage $U_s$ which is applied to the output of the power supply unit or after passing the stabilization circuit between the two leads which connect the power unit 3 with the second connection means 7.

The battery terminals 4 are operatively connected by at least one electric connection 8 with the second connection means 7 to supply electric power from the battery 5 to the second connection means 7. The first electric connection 8 includes at least one diode 9. As a result, no current from the battery 5 reaches the second connection means 7 as long as the voltage $U_s$ at the output of the stabilization circuit 10 is larger than the battery voltage, less the threshold voltage of diode 9. The at least one diode 9, which is preferably arranged as a Schottky diode through which a low threshold voltage can be achieved in addition to short switching times, is arranged with respect to its polarity in the first electric connection 8 in such a way that in the event of failure of the voltage supplied by the power unit 3 a current flow from the battery 5 to the fire detector 2 is ensured.

Figure 2:
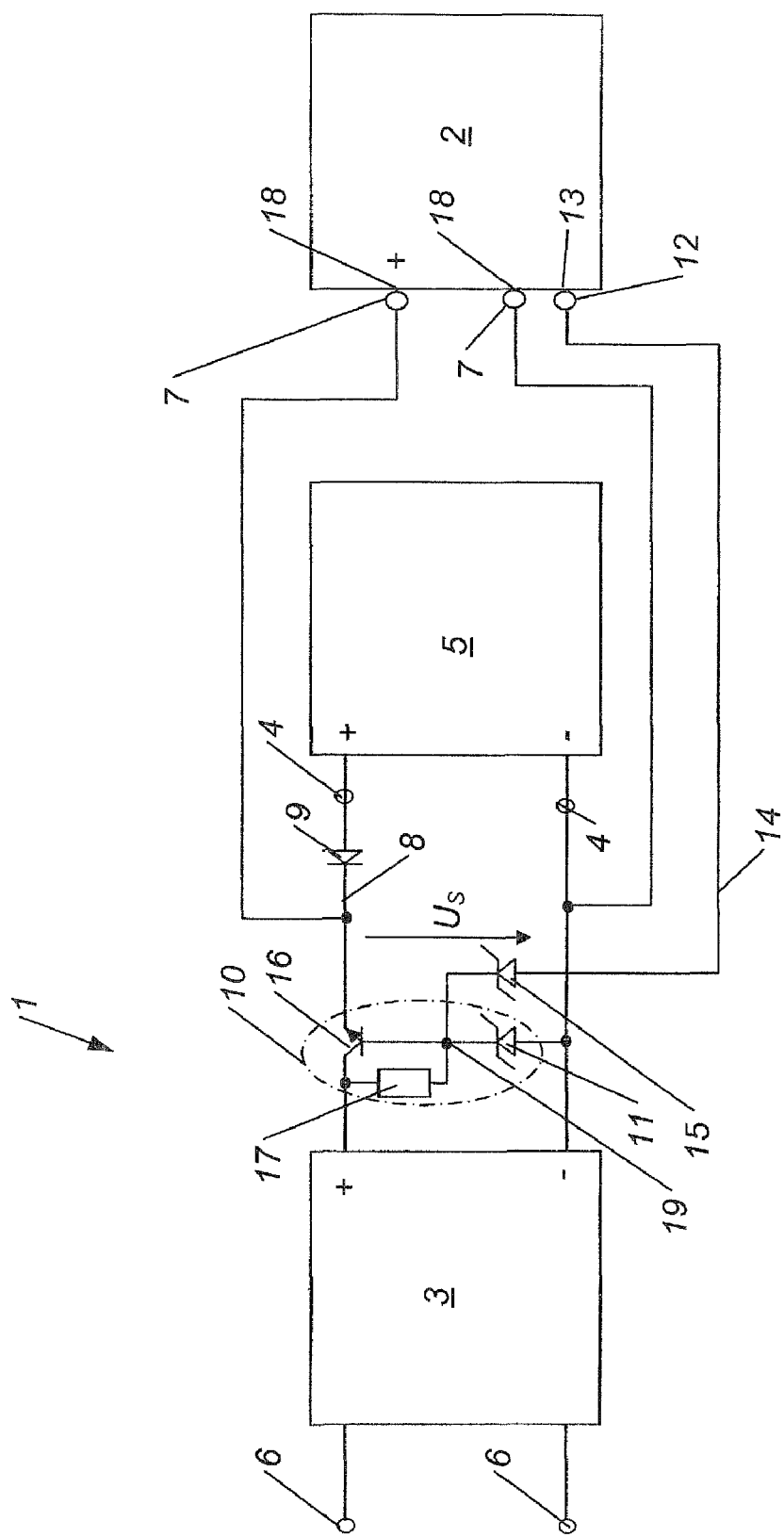
FIG. 2 shows a schematic circuit diagram of a second embodiment of a power supply unit according to the present invention.

Referring now to FIG. 2, there is shown a schematic circuit diagram of a second embodiment of a power supply unit 1 according to the present invention. Parts corresponding with those in FIG. 1 are denoted by identical reference numerals and not explained again. The description below will center on the differences between the embodiments. In this embodiment, the power supply unit 1 has third connection means 12 for connection to a test output 13 of the fire detector 2. The third connection means 12 are connected by means of a second electric connection 14 with the stabilization circuit 10. Modern fire detectors 2 have a so-called test output 13 with which a predeterminable, preferably periodic, monitoring of the charge state of a battery is possible. Such a test output 13 is for example also incorporated in smoke detectors which are equipped with the mentioned chip of type Motorola MC 145010. The second electric connection 14 includes a second Zener diode 15, e.g. a temperature-compensating Zener diode, and the second Zener diode 15 is operatively connected in parallel to the first Zener diode 14.

In FIG. 2, the power supply unit 1 is connected to the battery 5 and to the fire detector 2. The fire detector 2 includes the test output 13 in addition to inputs 18 for power supply. The fire detector 2 may include further outputs and/or inputs. As described above, the test output 13 is operatively connected with the stabilization circuit 10 by the second electric connection 14 which includes the second Zener diode 15. The input of the second Zener diode 15 at the non-conducting side is connected at a node 19 with the input of the first Zener diode 11 at the non-conducting side, the ohmic resistor 17 and the base of transistor 16. By changing the electric potential or a predeterminable test signal applied to the test output 13, the voltage $U_s$ applied after the stabilization circuit 10 can be reduced to such an extent that the power supply of the fire detector 2 occurs by the battery 5. Preferably, the battery voltage applied to the inputs 18 for power supply will be measured.

In a method for testing the battery voltage in a fire detector 2 in which a predeterminable battery 5 is connected to the battery terminals 4, it is provided that a predeterminable test signal is outputted to the stabilization circuit 10 at the test output 13 in predetermined intervals for a predeterminable period of time for lowering the electric voltage output in a predeterminable manner by the stabilization circuit 10 to the second connection means 7 to a predeterminable minimum permissible operating voltage of the fire detector 2, to thereby measure the battery voltage applied to the second connection means 7. It can thus be ensured that the connected battery 5 is functional. In this way, the functionality of the fire detector 2 can be enhanced in a simple way.

Suitably, the battery voltage is checked repeatedly in predeterminable, preferably periodic, intervals, e.g. every 30 to 60 seconds, with the voltage $U_s$ which is applied after the stabilization circuit 10 being lowered for a predeterminable brief period of approx. 5 to 50 milliseconds, through which the load on the battery 5 can be kept at a low level. The voltage $U_s$ which is applied to the stabilization circuit 10 is reduced to a value which is slightly above the minimum permissible supply voltage of the fire detector 2, through which it can be ensured that the operation of the fire detector 2 is not impaired by the battery test even in the case that there is no battery 5 or there is an insufficient charging state of the same.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A power supply unit for a fire detector, in particular a smoke alarm, said power supply unit comprising:
    a power unit having battery terminals for connecting a battery, said power unit having first connecting means for connection to a power supply network and second connecting means for connection of the fire detector; and
    at least one first electric connection operatively connecting the battery terminals to the second connecting means and including at least one diode.

2. The power supply unit of claim 1, wherein the at least one diode is arranged as a Schottky diode.

3. The power supply unit of claim 1, further comprising a stabilization circuit arranged between the power unit and the first electric connection for stabilizing an electric voltage at the second connecting means.

4. The power supply unit of claim 3, wherein the stabilization circuit includes a first Zener diode.

5. The power supply unit of claim 3, further comprising third connecting means for connection to a test output of the fire detector, and a second electric connection connecting the third connecting means with the stabilization circuit.

6. The power supply unit of claim 5, wherein the stabilization circuit includes a first Zener diode, said second electric connection including a second Zener diode arranged in parallel with the first Zener diode.

7. A fire alarm, comprising a power supply unit including a power unit having battery terminals for connecting a battery, said power unit having first connecting means for connection to a power supply network and second connecting means for connection of the fire detector, and at least one first electric connection operatively connecting the battery terminals to the second connecting means and including at least one diode.

8. A fire alarm, comprising a power supply unit including a power unit having battery terminals for connecting a battery, said power unit comprising:
    first connecting means for connection to a power supply network,
    second connecting means for connection of the fire detector,
    at least one first electric connection operatively connecting the battery terminals to the second connecting means and including at least one diode,
    a stabilization circuit arranged between the power unit and the first electric connection for stabilizing an electric voltage at the second connecting means, and
    third connecting means for connection to a test output of the fire detector, and a second electric connection connecting the third connecting means with the stabilization circuit.

9. The fire alarm of claim 8, further comprising a test output connected with the third connecting means for predeterminably testing a battery voltage of the battery.

10. A method for testing the battery voltage in a fire detector, comprising the steps of:
    connecting a battery to battery terminals of a power unit;
    outputting a test signal at a test output to a stabilization circuit of the power unit in predetermined intervals for a predefined period of time for lowering an electric voltage output by the stabilization circuit to connecting means of the power unit for connection of the fire alarm to a predeterminable minimum permissible operating voltage of the fire detector; and
    measuring a battery voltage applied to the connecting means.

* * * * *